UNITED STATES PATENT OFFICE 1,932,176

SULPHURIC ACID DERIVATIVES OF AMIDES

Fritz Guenther, Ludwigshafen - on - the - Rhine, Ferdinand Muenz, Frankfort - on - the - Main-Fechenheim, and Hans Haussmann, Mannheim, Germany, assignors to I. G. Farbenindustrie Aktiengesellschaft, Frankfort - on - the - Main, Germany No Drawing. Application April 4, 1930, Serial No. 441,717, and in Germany April 12, 1929

19 Claims.  (Cl. 260—124)

The present invention relates to the production of wetting, cleansing and dispersing agents.

We have found that excellent wetting, cleansing, and dispersing agents are obtained by reacting on carboxylic acids of the aliphatic, cycloaliphatic, mixed aromatic-aliphatic, or aromatic series, which term is meant to include the derivatives of the said acids such as anhydrides, esters or halides and the like, with nitrogenous bases, containing at least one hydrogen atom connected with a nitrogen atom and free from aliphatic, alcoholic and chromophorous groups, of aliphatic, cycloaliphatic or aromatic nature, the reaction products being then treated with a suphonating agent to introduce sulphuric derivative radicals, that is, sulphonic acid or sulphuric ester radicals and form either sulphonic acids or sulphuric esters or mixtures of both or products which contain both sulphuric ester and sulphonic acid groups, if the primary products do not already contain, or only contain an insufficient quantity of, sulphuric ester or sulphonic groups. The acid components of the amides may be chosen from the acids of oils or fats of vegetal, i. e. animal and vegetable origin, or from the oils or fats themselves, as well as from the synthetic high molecular fatty acids obtainable by the oxidation of paraffin wax and similar high molecular hydrocarbons by means of gaseous oxidizing agents, from resinic acids or naphthenic acids or from the condensation products of unsaturated aliphatic carboxylic acids with aromatic compounds or from mono- or poly- nuclear aromatic carboxylic acids; lower aliphatic carboxylic acids, such as lactic, sulphoacetic or propionic acids may also be employed but in these cases the amines should contain such a high number of carbon atoms that the sum of carbon atoms in the amides should be at least eight. The said nitrogenous bases may be chosen from ammonia, primary or secondary amines such as aliphatic amines for example mono- or di-ethyl amine, butyl amine, hexyl or cetyl amines, cycloaliphatic amines, for example cyclohexyl amine and its homologues, aliphatic- aromatic amines, for example benzyl amine or methyl benzyl amine, aromatic amines, such as aniline, ethyl aniline, diphenyl amine, naphthyl amine, benzyl naphthyl amine, or heterocyclic bases such as morpholine or piperidine. In any case it is preferable that these amines do not contain aliphatic alcoholic groups since otherwise esters might be obtained instead of the desired amides depending upon the reaction conditions. The said bases may be employed in the free state or also in the form of their salts when alkaline agents are present during the formation of the amides. As mentioned above the amines may already contain one or more sulphuric ester or sulphonic groups and in this case the subsequent sulphonation may be dispensed with; the amides containing a lower number of sulphuric ester or sulphonic groups are usually suitable as washing and scouring agents and their solubility in water may be increased by introducing further sulphuric ester or sulphonic groups. Thus for example the carboxylic acids may be converted into amides with the aid of amino sulphonic acids as for example sulphanilic acid, ethyl sulphanilic acid, taurine ($C_2H_6NSO_3H$) and the like; on the other hand the carboxylic acids may contain sulphuric ester and/or sulphonic groups as for example oleic sulphonic acid, or oleic sulphonic methyl ester, oleic methyl ester sulphuric ester, ricinoleic sulphuric ester, palmitic mono sodium sulphonate and the like. Generally speaking it is advisable to take higher amines such as cetyl amine or ethyl aniline for the conversion when lower carboxylic acids such as benzoic acid or caproic acid are employed, and higher carboxylic acids or their derivatives, such as oleic acid and castor oil, when ammonia or lower amines, such as diethyl amine, are used. Particularly suitable are in many cases products which have been prepared from higher carboxylic acids, or their derivatives, and from higher nitrogenous bases.

In the aforesaid reactions secondary amines furnish products which are particularly resistant to hydrolysis by the action of alkaline agents; similar products can be obtained by subsequently treating products obtained with the aid of ammonia, or of primary amines, with alkylating or aralkylating agents either before or after the sulphonation. Thus for example stearic anilide may be methylated with the aid of dimethyl sulphate after the anilide has been converted into its sodium salt

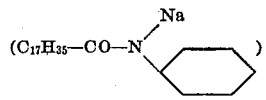

with the aid of sodium alcoholate. The action and results of the sulphonation depend on the materials to be sulphonated and on the conditions of the sulphonating treatment. Sulphuric esters for example can be obtained from amides containing olefinic and/or hydroxyl groups. For the production of sulphuric esters the sulphonation may be carried out with sulphuric acid or also with stronger sulphonating agents such as fuming sulphuric acid, sulphur trioxide or chlorsulphonic acid, which latter agents are usually employed in cases when the initial materials contain one or more hydroxyl groups. The sulphonation may be carried out in the presence of diluents such as carbon tetrachloride, trichlor ethylene, nitrobenzene, acetic acid and the like which usually allow of reducing the temperature of sulphonating, and/or in the presence of agents removing water, such as anhydrides or chlorides of organic or inorganic acids. At least one molecular proportion of sulphonating agent is usually employed with each molecular proportion of the reaction products of the aforesaid carboxylic acids with nitrogenous bases, but in the aforesaid case of sulphonating compounds containing hydroxyl groups with strong sulphonating agents such as sulphur trioxide or chlorsulphonic acid, or with mixtures of milder sulphonating agents with the strong sulphonating agents or with agents removing water, the quantity of the strong sulphonating agents or of the agents removing water should not exceed one molecular proportion for each hydroxyl group. In most cases, the temperature employed during the sulphonation should not considerably exceed 40° centigrade when more than one molecular proportion of sulphonating agent is employed for each molecular proportion of amide.

If, however, sulphonic acids are to be produced and when the primary reaction products do not already contain one or more sulphonic groups and no aromatic radicles, the temperature of a sulphonation by means of sulphuric acid monohydrate must exceed 40° centigrade, a temperature of about 100° centigrade being preferably chosen, since otherwise sulphuric esters are formed or no reaction takes place. When stronger sulphonating agents such as fuming sulphuric acid, sulphur trioxide or chlorsulphonic acid or mixtures of mild sulphonating agents with these or with agents removing water be employed for this sulphonation of compounds containing one or more hydroxyl groups, the quantity of these strong sulphonating agents or of the agents removing water must exceed one molecular proportion per each hydroxyl group present. It is obvious that variations of the conditions described may lead to the production of mixed products. When the amides contain aromatic nuclei the sulphonation will generally lead to sulphonic acids but also sulphuric ester radicles may be introduced into an aliphatic radicle of such amide when the latter contains olefinic and/or hydroxyl groups. On working with considerable quantities of strong sulphonating agents, however, sulphonic radicles may be introduced into an aliphatic radicle of such amide together with a sulphonation of the nucleus.

The resulting products are distinguished by excellent wetting properties, in neutral, acid or also alkaline baths. The products also possess high stability in hard water or solutions made therewith. Consequently the products according to the present invention constitute highly valuable assistants for all the branches of the textile and allied industries. The amides and anilides prepared from unsaturated or hydroxyl bearing fatty or resinic acids, and sulphonation, may generally find useful application especially as wetting agents, whereas amides prepared from olefinic or mixed aliphatic-aromatic amines and fatty acids free from hydroxyl groups or from anilides, and sulphonation, are particularly valuable washing, scouring and emulsifying agents, as well as the products prepared by the condensation of high molecular carboxylic acids and amines containing sulphonic or sulphuric groups or by the condensation of higher amines with carboxylic acids containing sulphonic or sulphuric groups. Particularly valuable are the products in which both hydrogen atoms of an amide are substituted by alkyl, cycloalkyl, aralkyl or aryl groups. The wetting power of these amides is considerably higher than that of the amides which contain one or two hydrogen atoms connected with the nitrogen atom of the amide group. They are particularly stable even in hot alkaline baths, show a particularly high emulsifying and levelling power and a far reaching power for dispersing water-insoluble or difficultly water-soluble solid substances such as alkaline earth metal soaps, water-insoluble dyestuffs or other water-insoluble coloring materials, fats, waxes and the like.

The sulphonated amides according to the present invention may be employed as such or in conjunction with other wetting or emulsifying agents such as soaps, products of the type of Turkey red oils, sulphonic acids of aromatic and particularly of poly-nuclear compounds or their salts, hydroxyalkyl amines, quaternary ammonium bases or their salts, or with protective colloids such as glue, gelatine or vegetable mucilages or gums. Salts as for example soda, sodium bicarbonate, waterglass, common salt, neutral or acid sodium sulphate may be added or organic solvents, such as mono-cresyl ethylene glycol ether, trichlor ethylene or bleaching agents such as perborates, percarbonates, para-toluene sulphonic chloramide sodium. The said agents are employed in quantities depending on the desired purpose and several of them may be added conjointly. Thus for example the quantity of these additions may be the same as that of the sulphonated amides or considerably higher depending on the purposes of emulsifying, wetting, washing, cleaning or dispersing solid water-insoluble materials in water. In baths for the treatment of textiles the quantity of the sulphonated amides may be as low as a few per cent or even a few per thousand of the whole liquors.

All the products according to the present invention must be free from chromo-phorous groups since otherwise they would be inoperative for the different purposes of their application.

The following examples will further illustrate the nature of this invention but the invention is not restricted to these examples. The parts are by weight.

*Example 1*

282 parts of oleic acid are converted, in the usual manner, into oleic amide, and this, by treatment with about 350 parts of concentrated sulphuric acid at about 35° centigrade in the presence of 500 parts of trichlorethylene, is converted into the acid sulphuric ester of oleic amide. The resulting product possesses excellent wetting properties, even in alkaline baths. When no solvent is employed the sulphonation is carried out at about 100° centigrade.

*Example 2*

100 parts of oleic diethylamide obtainable by boiling under reflux a solution in ethyl alcohol of oleic methyl ester and diethyl amine, are dissolved in 300 parts of trichlorethylene and then treated with 85 parts of sulphuric acid monohydrate preferably at a temperature below zero centigrade. After dilution with water containing some ice the lower layer formed is separated and then neutralized. The solution obtained which generally is quite clear becomes turbid by adding more water and separates after standing for some time into two layers, the lower layer of which contains the trichlorethylene and the constituents which have not reacted with the sulphuric acid, and is drawn off. The upper layer which still contains some trichlorethylene and water is evaporated to the desired concentration. The product obtained possesses a particularly high wetting power which is superior to that of the product obtained according to the foregoing example and is also superior to that of a sulphuric ester of an oleic mono-alkylamide. Each 0.4 gram of the product obtained is dissolved in 1 liter of water. Even with this low concentration the bath shows an excellent wetting effect which is about 3 times that of sulphonated oleic amide and about 4 to 5 times that of sulphonated oleic acid.

*Example 3*

100 parts of oleic ethylanilide obtainable by heating oleic acid and mono-ethyl aniline until the distillation of water has ceased are dissolved in 200 parts of trichlorethylene and are then treated at about zero centigrade with 75 parts of sulphuric acid monohydrate. The reaction mixture is then incorporated with water containing some ice, the sulphonated layer is then drawn off, neutralized and freed from trichlorethylene by distillation. The properties of the product obtained are similar to those of the product obtained according to Example 2.

When cotton is dyed with a bad levelling vat dye with an addition of 2 grams per liter of the vat of the product obtained according to this example very uniform dyeings are obtained even in pale shades, the levelling effect and particularly the wetting effect of the sulphonation product being considerably superior to that from oleic anilide.

*Example 4*

An equimolecular quantity of oleic diphenylamide obtainable by warming oleic chloride with diphenyl amine instead of the anilide referred to in the foregoing example is treated and worked up in the same manner as is described in the foregoing example, whereby a product is obtained which shows properties equally as good as those of the product obtained according to the foregoing example.

100 parts of commercial oleic acid are incorporated with 5 parts of the product obtained and 100 parts of water are added while stirring. Already the said small quantity of the emulsifying agent furnishes a stable thinly liquid emulsion which is suitable for oiling wool. The wetting power of the product is the same as that of the product prepared according to the foregoing example.

*Example 5*

200 parts of ethylaniline-m-sulphonic acid are treated with 250 parts of oleic chloride in a weak caustic soda solution, the reaction mixture being constantly kept slightly alkaline by gradually adding caustic soda. After the reaction the mass is rendered slightly acid, so that litmus paper is colored red and oleic acid formed is separated, whereupon the product is recovered from the solution by salting out and shows a very good wetting power.

*Example 6*

284 parts of stearic acid are heated under reflux for 24 hours with mono-ethyl-$\alpha$-naphthylamine, whereupon remainders of the amine are removed with aqueous dilute hydrochloric acid. The product is then dried and dissolved in 400 parts of sulphuric acid monohydrate while warming, whereupon 400 parts of fuming sulphuric acid with a content of 23 per cent of sulphur trioxide are gradually added and the mixture is heated to 100° centigrade. The reaction mixture is kept at this temperature until the product is soluble in water, and is then poured onto ice and neutralized with lime, a sodium salt being then prepared from the calcium salt by means of soda.

*Example 7*

460 parts of benzyl-$\alpha$-naphthylamine are brought into reaction with 190 parts of benzoyl chloride, the reaction being completed by heating to 100° centigrade. By washing with acid and alkali solution the reaction product is freed from remainders of initial material and is then dried and subsequently sulphonated at 100° centigrade with the aid of 400 parts of fuming sulphuric acid containing 12 per cent of sulphur trioxide until the product is water-soluble. The reaction product is then poured onto ice, incorporated with lime and after removal of gypsum the sodium salt is prepared in the usual manner with the aid of soda. The sodium salt is soluble even in acid baths and possesses a good wetting power.

*Example 8*

10 parts of oleic amide are stirred with 50 parts of ethyl ether, whereupon 29 parts of chlorsulphonic acid are added while stirring. Stirring is continued for five hours at about 30° centigrade. The sulphonic acid can be separated from the reaction mixture in the form of an alkali metal salt.

*Example 9*

300 parts of coco oil fatty acid chloride are introduced into a solution of 300 parts of taurine sodium ($NH_2$—$CH_2$—$CH_2$—$SO_3NA$) in 3000 parts of water at from 0° to 10° centigrade. The mixture is then stirred at room temperature until a sample is soluble in water. The product obtained is a highly efficient washing and scouring agent.

*Example 10*

100 parts of oleic hydroxyethyl-meta-toluidide, obtainable from oleic chloride and hydroxyethyl-m-toluidine, are mixed with 100 parts of sulphuric acid monohydrate while cooling and stirred therewith after adding 100 parts of trichlorethylene. After neutralizing and if desired removing the solvent, the sulphonation product is diluted with water up to 300 parts. The viscous liquid constitutes an efficient wetting and emulsifying agent which is stable against hard water.

When 100 grams of the product are dissolved in 100 liters of water having a hardness of 20° (German scale) and a soap solution is added to the solution, a turbid liquid is obtained in which the calcium soap remains very finely dispersed whereas without the addition smeary flakes of calcium soap separate out.

*Example 11*

932 parts of castor oil are dissolved in 1000 parts of ethyl alcohol and the solution is saturated with gaseous ammonia. After standing for some time the castor oil is converted practically completely into the amide. The remaining ammonia is then removed and the alcohol is distilled off. The mixture of the amide and glycerol is then suspended in 3000 parts of ethyl ether and 696 parts of chlorsulphonic acid are then added at from 0° to 10° centigrade. After the evolution of hydrochloric acid has ceased a mixture of the sulphuric ester of ricinoleic amide with glycerol sulphuric acid and free mineral acid is obtained. This mixture is poured onto ice, then rendered neutral and the reaction product is allowed to settle. Three layers are formed, the upper of which consists of the main quantity of the ether, the middle layer of the reaction product whereas the lower layer is an aqueous salt solution. The middle layer is separated and the ether is evaporated therefrom by warming. Instead of ethyl ether ethyl acetate or another inert diluent may be employed. The product obtained possesses a very high wetting capacity and wets quickly difficultly wettable unbucked cotton goods.

*Example 12*

1000 parts of crude ricinoleic amide as prepared in accordance with the foregoing example are introduced into 2000 parts of liquid sulphur dioxide whereupon 500 parts of gaseous sulphur trioxide are led into the mixture. The sulphur dioxide is then distilled off and the reaction is completed by keeping standing the reaction mixture at room temperature for 10 hours; it is then incorporated with ice and rendered neutral whereby the sulphonation product of the amide separates out as an oily liquid.

*Example 13*

100 parts of hydroxystearic methyl ester are heated in a pressure-tight vessel with 200 parts of ammonia for 4 hours at 150° centigrade. The product obtained is then freed from ammonia and methyl alcohol and led at from 10° to 15° centigrade into a mixture of 50 parts of acetic anhydride and 50 parts of sulphuric acid monohydrate. After stirring for 2 hours at room temperature the reaction product is poured onto ice, rendered neutral and salted out.

*Example 14*

31 parts of ricinoleic methyl ester are treated with a mixture of 10 parts of ethyl ether and 10 parts of chlorsulphonic acid. As soon as a sample is soluble in water the reaction product is neutralized with gaseous ammonia and the ether is distilled off in vacuo. The product is then heated in a closed vessel together with 100 parts of ammonia for 10 hours to 100° centigrade. After removal of remainders of ammonia the product is treated with water and the aqueous solutions show a good wetting, cleansing and emulsifying effect.

*Example 15*

100 parts of fused ricinoleic amide are incorporated at 70° to 75° centigrade with a mixture of 300 parts of ethyl ether and 430 parts of chlorsulphonic acid in a vessel provided with a stirring device and a reflux condenser. The temperature decreases to about 40° centigrade and the mixture is stirred for 2 hours whereupon the reaction mixture is poured onto ice, rendered neutral with the aid of aqueous caustic soda and freed from the ether. The upper oily layer contains the desired sodium salt of the sulphonation product.

*Example 16*

1,000 parts of a mixture of fatty acids obtained by the oxidation of paraffin with the aid of air while warming and separating the acids from unattacked initial material, are heated under reflux with 2,000 parts of aniline for 17 hours to 180° to 190° centigrade the water formed during the reaction being continuously distilled off. The remainders of free aniline are then distilled off in vacuo and the residue is dissolved in 4,750 parts of sulphuric acid monohydrate. 2,200 parts of fuming sulphuric acid containing 23 per cent of sulphur trioxide are then introduced into the solution at about 10° centigrade and the mixture is stirred for about 20 hours at 20° to 25° centigrade. The reaction product is then poured onto a mixture of ice and common salt and filtered. The product may be employed as such or after neutralization with caustic soda, if desired after removal of the mineral acid salts. It possesses a high resistance to acid and high scouring power superior to that of soaps and is not precipitated from aqueous solutions by means of alkaline earth metals.

What we claim is:

1. The process for the production of carboxylic arylides containing sulphuric derivative radicals which comprises reacting an aliphatic compound containing the grouping

in which X is either halogen

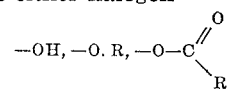

R being an unsaturated aliphatic radical, which radical may contain sulphuric ester or sulphonic acid groups with an ammonia base corresponding to the formula

in which X' denotes an aromatic radical free from aliphatic alcoholic and chromophorous groups and $X_2$ denotes hydrogen or the same as X', all of which radicals may contain sulphuric derivative groups, and if the above initial reacting components do not contain sulphuric ester or sulphonic acid groups, reacting the resulting amide with a sulphonating agent.

2. Carboxylic arylides having the following structure

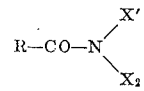

in which R is an unsaturated aliphatic hydrocarbon radical or a saturated aliphatic hydrocarbon radical derived from an unsaturated aliphatic hydrocarbon radical and containing at least one sulphuric derivative substituent selected from the class consisting of $-SO_3H$ and $-O.SO_3H$ groups connected to a carbon atom of said radical, the saturation of said unsaturated aliphatic hydrocarbon radical being effected by the sulphuric derivative substituent, X' is an aromatic radical free from aliphatic alcoholic and chromophorous groups and $X_2$ is hydrogen or the same as X', X' or $X_2$ containing a sulphuric derivative radical in the event that R is unsaturated.

3. Carboxylic arylides having the following structure

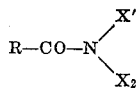

in which R is an unsaturated aliphatic hydrocarbon radical or a saturated aliphatic hydrocarbon radical derived from an unsaturated aliphatic hydrocarbon radical and containing at least one sulphuric derivative substituent selected from the class consisting of —$SO_3H$ and —O—$SO_3H$ groups connected to a carbon atom of said radical, the saturation of said unsaturated aliphatic hydrocarbon radical being effected by the sulphuric derivative substituent, $X'$ and $X_2$ are aromatic radicals free from aliphatic alcohol and chromophorous groups, $X_1$ or $X_2$ containing a sulphuric derivative radical in the event that R is unsaturated.

4. The process for the production carboxylic arylides containing sulphuric derivative radicals which comprises reacting an unsaturated fatty acid with an aromatic nitrogenous base, in which base at least one hydrogen atom is connected to a nitrogen atom and the remaining substituents thereof are aromatic radicles free from aliphatic alcoholic and chromophorous groups thereby producing a carboxylic arylide and reacting a sulphonating agent with the arylide.

5. A carboxylic arylide from an unsaturated fatty acid and an aromatic nitrogenous base, in which base at least one hydrogen atom is connected to a nitrogen atom and the remaining substituents thereof are aromatic radicles free from aliphatic alcoholic and chromophorous groups, which arylide contains at least one of the sulphuric derivative radicles selected from the group consisting of —$SO_3H$ and —$OSO_3H$ radicles connected to a carbon atom.

6. A carboxylic arylide from an unsaturated fatty acid and a secondary aromatic nitrogenous base, which base is free from aliphatic alcoholic and chromophorous groups, and which arylide contains at least one of the sulphuric derivative radicles selected from the group consisting of —$SO_3H$ and —$OSO_3H$ radicles connected to a carbon atom.

7. A carboxylic arylide from an aliphatic, arylsubstituted carboxylic acid and an aromatic nitrogenous base, in which base at least one hydrogen atom is connected to a nitrogen atom and the remaining substituents thereof are aromatic radicles free from aliphatic alcoholic and chromophorous groups, which arylide contains at least one of the sulphuric derivative radicles selected from the group consisting of —$SO_3H$ and —$OSO_3H$ radicles connected to a carbon atom.

8. A carboxylic arylide from an aliphatic unsaturated carboxylic acid and an aromatic nitrogenous base, in which base at least one hydrogen atom is connected to a nitrogen atom and the remaining substituents thereof are aromatic radicles free from aliphatic alcoholic and chromophorous groups, which arylide contains at least one of the sulphuric derivative radicles selected from the group consisting of —$SO_3H$ and —$OSO_3H$ radicles, at least one sulphuric derivative radicle being connected to a carbon atom of the nitrogenous base radicle.

9. A carboxylic arylide from an unsaturated fatty acid of vegetal origin and an aromatic nitrogenous base, in which base at least one hydrogen atom is connected to a nitrogen atom and the remaining substituents thereof are aromatic radicles free from aliphatic alcoholic and chromophorous groups, which arylide contains at least one —$SO_3H$ radicle connected to a carbon atom of the nitrogenous base radicle.

10. A carboxylic arylide from an aliphatic unsaturated carboxylic acid and a primary aromatic amine, which amine is free from aliphatic alcoholic chromophorous groups, and which arylide contains at least one —$SO_3H$ radicle connected to a carbon atom of the aromatic amine radicle.

11. A carboxylic arylide from an aliphatic unsaturated carboxylic acid and a secondary aromatic amine, which amine is free from aliphatic alcoholic and chromophorous groups, and which arylide contains at least 8 carbon atoms in its molecule and at least one —$SO_3H$ radicle connected to a carbon atom of the aromatic amine radicle.

12. A carboxylic arylide from oleic acid and an aromatic amine, in which amine at least one hydrogen atom is connected to a nitrogen atom and the remaining substituents thereof are aromatic radicles free from aliphatic alcoholic and chromophorous groups, which arylide contains at least one sulphonic acid radicle in the radicle of said amine.

13. A carboxylic arylide from oleic acid and an aromatic secondary amine, which amine is free from aliphatic alcoholic and chromophorous groups, and which arylide contains at least one sulphonic acid radicle in the radicle of said amine.

14. A carboxylic arylide from an aliphatic unsaturated carboxylic acid and an aromatic nitrogenous base, in which base at least one hydrogen atom is connected to a nitrogen atom and the remaining substituents thereof are aromatic radicles free from aliphatic alcoholic and chromophorous groups, which arylide contains at least one of the sulphuric derivative radicles selected from the group consisting of —$SO_3H$ and —$OSO_3H$ radicles connected to a carbon atom of the carboxylic acid radicle.

15. A carboxylic arylide from an aliphatic unsaturated carboxylic acid and an aromatic secondary amine, in which amine at least one hydrogen atom is connected to a nitrogen atom and the remaining substituents thereof are aromatic radicles free from aliphatic alcoholic and chromophorous groups, which arylide contains at least one of the sulphuric derivative radicles selected from the group consisting of —$SO_3H$ and —$OSO_3H$ radicles connected to a carbon atom of the carboxylic acid radicle.

16. A carboxylic arylide from an aliphatic unsaturated carboxylic acid or vegetal origin with an aromatic nitrogenous base, in which base at least one hydrogen atom is connected to a nitrogen atom and the remaining substituents thereof are aromatic radicles free from aliphatic alcoholic and chromophorous groups, which arylide contains at least one of the sulphuric derivative radicles selected from the group consisting of —$SO_3H$ and —$OSO_3H$ radicles connected to a carbon atom of the carboxylic acid radicle.

17. A carboxylic arylide from an aliphatic unsaturated carboxylic acid of vegetable origin and an aromatic amine, in which amine at least one hydrogen atom is connected to a nitrogen atom and the remaining substituents thereof are aromatic radicles free from aliphatic alcoholic and chromophorous groups, which arylide contains at least one of the sulphuric derivative radicles selected from the group consisting of —$SO_3H$ and —$OSO_3H$ radicles connected to a carbon atom of the carboxylic acid radicle.

18. A sulphonated carboxylic arylide from an aliphatic unsaturated carboxylic acid and an aromatic amine, in which amine at least one hydrogen atom is connected to a nitrogen atom and the remaining substituents thereof are aromatic radicles free from aliphatic alcoholic and chromophorous groups, which arylide contains a sulphonic acid radicle in the carboxylic acid radicle.

19. A carboxylic amide from oleic acid and an aromatic amine, in which amine at least one hydrogen atom is connected to a nitrogen atom and the remaining substituents thereof are aromatic radicles free from aliphatic alcoholic and chromophorous groups, which arylide contains a sulphuric ester radicle in the carboxylic acid radicle.

FRITZ GUENTHER.
FERDINAND MUENZ.
HANS HAUSSMANN.